United States Patent [19]
Ishikawa et al.

[11] 3,804,468
[45] Apr. 16, 1974

[54] DUAL HYDRAULIC BRAKING SYSTEM

[75] Inventors: Masakazu Ishikawa; Hiroyuki Oka, both of Toyota, Japan

[73] Assignee: Toyota Jidosha Kogyo Kabushiki Kaisha, Toyota-shi, Aichi-ken, Japan

[22] Filed: Apr. 12, 1973

[21] Appl. No.: 350,380

Related U.S. Application Data

[62] Division of Ser. No. 77,150, Oct. 1, 1970, Pat. No. 3,729,237.

[52] U.S. Cl................ 303/6 C, 188/349, 303/84 A
[51] Int. Cl................ B60t 13/00, B60t 15/46
[58] Field of Search........ 303/6 C, 6 R, 84 A, 84 R; 188/151 A, 152, 349

[56] References Cited
UNITED STATES PATENTS

| | | | |
|---|---|---|---|
| 3,441,318 | 4/1969 | Bueler | 303/6 C |
| 3,450,443 | 6/1969 | Bueler | 303/6 C |
| 3,467,440 | 9/1969 | Strien | 303/84 A |
| 3,504,948 | 4/1970 | Inada | 303/6 R |

Primary Examiner—Duane A. Reger
Assistant Examiner—D. C. Butler
Attorney, Agent, or Firm—McGlew and Tuttle

[57] ABSTRACT

A hydraulic brake system comprises two separate hydraulic circuits, one for the front wheels and the other for the rear wheels of an automotive vehicle. Both circuits are connected hydraulically to a master cylinder, and one of the hydraulic circuits contains a control valve assembly for varying the pressure of the hydraulic brake fluid in that circuit. Balance piston means, subjected to the pressure of the master cylinder and the pressure in the other of the two circuits, are provided in operative engagement with the control valve assembly for maintaining the control valve assembly in the inoperative condition when a failure occurs in the circuit connected to the balance piston means. As a result, the circuit containing the valve assembly operates at the pressure supplied from the master cylinder.

14 Claims, 8 Drawing Figures

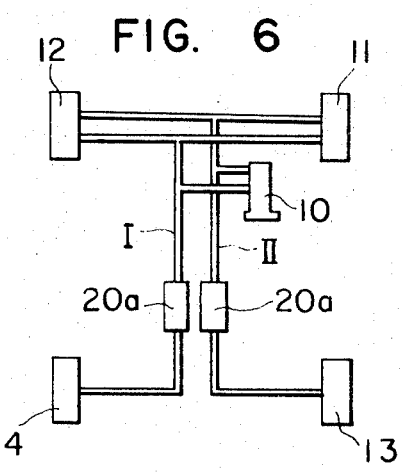
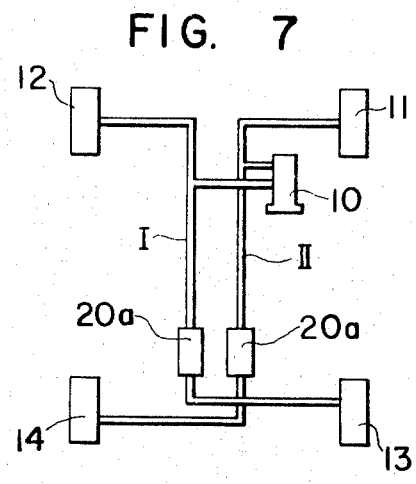
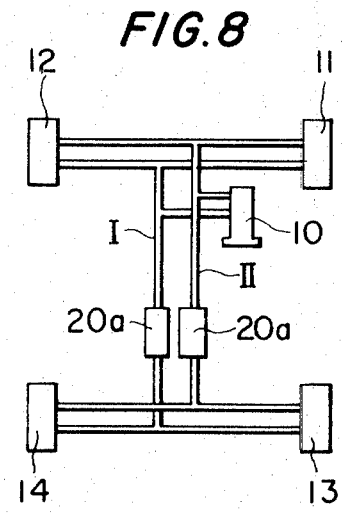

DUAL HYDRAULIC BRAKING SYSTEM

CROSS REFERENCE TO RELATED APPLICATION

This application is a division of application Ser. No. 77,150, filed Oct. 1, 1970, for "Split Hydraulic Braking System" now U.S. Pat. No. 3,729,237.

FIELD AND BACKGROUND OF THE INVENTION

The present invention is directed to a split or dual hydraulic brake system commonly used in the service brake systems of automotive vehicles and, more particularly, it concerns the arrangement of a control valve assembly positioned in one hydraulic circuit with means for placing the valve assembly in the inoperative condition.

Split braking systems for service brakes generally refer to a system in which the hydraulic brake fluid is supplied independently to separate hydraulic circuits each servicing either the front or rear wheels of the vehicle. As a general rule, in conventional split hydraulic brake systems, the front wheel cylinders are pressurized directly from the master cylinder at the braking force determined in direct response to the force exerted on the brake pedal. However, the pressure communicated from the master cylinder to the circuit containing the rear wheels is processed through a control valve assembly which adjusts the fluid pressure to a lower level. In such a brake system, if a failure occurs in the circuit servicing the front wheels, it is necessary to apply a greater force on the brake pedal for the purpose of developing a sufficient braking force in the rear wheel cylinders.

SUMMARY OF THE INVENTION

It is the primary object of the present invention, to provide a control arrangement for a split hydraulic brake system in which a control valve assembly is located in one of the hydraulic circuits so that when a failure occurs in the other hydraulic circuit, the control valve assembly is rendered inoperative and the full braking pressure from the master cylinder is developed in the wheel cylinders in the circuit containing the valve assembly.

Accordingly, in the present invention, a split hydraulic brake system for an automotive vehicle is divided into two separate hydraulic circuits, one containing the brake cylinders for the front wheels and the other containing the brake cylinders for the rear wheels. A master cylinder supplies hydraulic braking fluid to each of the circuits in direct relationship to the force exerted on a brake pedal. A control valve assembly is positioned in one of the hydraulic circuits for varying the brake fluid pressure delivered to the brake cylinders in that circuit. In the event a failure occurs in the circuit which does not contain the control valve assembly, an arrangement is provided to monitor the failure and place the control valve assembly in its inoperative condition so that the full pressure developed within the master cylinder is supplied to the brake cylinders in the circuit containing the valve assembly. The pressure of the hydraulic brake fluid can be monitored by mechanical or electrical means.

In accordance with the characteristic functioning of the control valve assembly described above, the valve action in the assembly can be provided by any of the following: hydraulic pressure-proportioning valve means, limiting valve means, or load-sensing valve means. Normally, the control valve assembly is associated with the rear wheel brake cylinders for providing a lower braking pressure in the rear cylinders than in the front cylinders and thereby avoiding rear wheel lock. Where a hydraulic pressure-proportioning valve is used, a valve piston is resiliently biased into contact with a cylindrical plug. On the end of the valve piston, adjacent the cylindrical plug, a chamber is formed for housing a poppet valve, and the chamber is maintained in hydraulic communication with the master cylinder. Due to the resilient biasing of the valve piston against the cylindrical plug, the poppet valve is abutted against the cylindrical plug and the valve is maintained in its opened condition. When the braking force developed in the master cylinder is below a selected level, the pressurized braking fluid flows through the proportioning valve without any change occurring in the pressure supplied to the rear brake cylinders. However, when the braking pressure exceeds the selected level, the braking pressure supplied to the rear brake cylinders is reduced at a certain rate as compared to the pressure supplied from the master cylinder into the control valve assembly.

In one embodiment of the present invention, the valve piston is movable in a cylinder having its end closed by the cylindrical plug. A second cylinder is provided in axial alignment with this cylinder and contains a balance piston having a piston rod projecting through an aperture in a partition to selectively engage that end of the valve piston opposite the end having the poppet valve. The balance piston is subjected to the pressure of the master cylinder on one side and to the pressure in the front brake hydraulic circuit on the opposite side. When the pressure to the front brakes fails, the pressure of the master cylinder moves the balance piston to project the end of the piston rod against the valve piston to maintain the latter in an inoperative state.

In another embodiment of the invention, the piston rod of the balance piston extends transversely of the direction of axial movement of the valve piston, and carries an abutment normally positioned substantially on the axis of the valve piston. The end of the valve piston opposite to that carrying the poppet valve is formed with a recess to receive this abutment. Under normal conditions, the valve piston is displaceable to engage the abutment into the recess but, if the front brakes fail, the balance piston displaces the abutment into a position where it prevents movement of the valve piston, thus maintaining the same inoperative.

In a third embodiment of the invention, the balance piston is disposed in a cylinder axially aligned with the valve piston, and has a piston rod extending through an aperture in a partition to engage the stem of the poppet valve. In this embodiment of the invention, the balance piston is biased in one direction by spring pressure and in the opposite direction by the pressure of the hydraulic fluid in the front brake hydraulic circuit.

In still another embodiment, by-pass valves are provided in parallel with the control valve assembly for hydraulically opening the control valve assembly when a pressure failure occurs in the other hydraulic circuit. When the by-pass valves are opened, the control valve assembly no longer is effective within the hydraulic circuit.

For an understanding of the principles of the invention, reference is made to the following description of typical embodiments thereof as illustrated in the accompanying drawings.

BRIEF DESCRIPTION OF THE DRAWING

In the drawing:

FIGS. 6, 7 and 8 schematically illustrate dual hydraulic brake systems embodying the invention.

DESCRIPTION OF GENERAL BACKGROUND OF INVENTION

Figure 1:
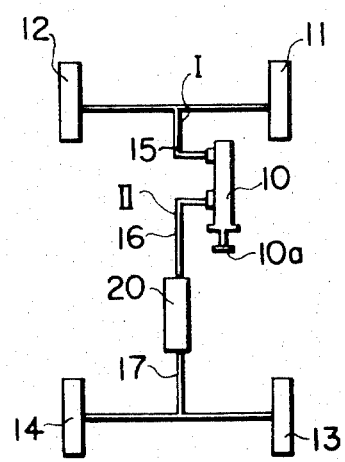
FIG. 1 is a schematic showing of the general arrangement of a split hydraulic brake system.

In FIG. 1, a typical split or dual hydraulic braking system is shown which includes a master cylinder 10 arranged to supply pressurized hydraulic braking fluid into lines 15 and 16 at a braking force proportional to the pressure exerted on a brake pedal 10a operatively associated with the master cylinder. A pair of front wheel cylinders 11 and 12 are connected to the master cylinder by the line 15, this part of the overall system being designated as hydraulic circuit I. Rear wheel cylinders 13 and 14 are connected to the master cylinder 10 by means of the line 16, a control valve assembly 20 and another line 17, this portion of the overall system being designated as hydraulic circuit II. The control valve assembly 20 regulates the pressure supplied to the rear wheel cylinders 13 and 14 from the master cylinder.

Figure 2:
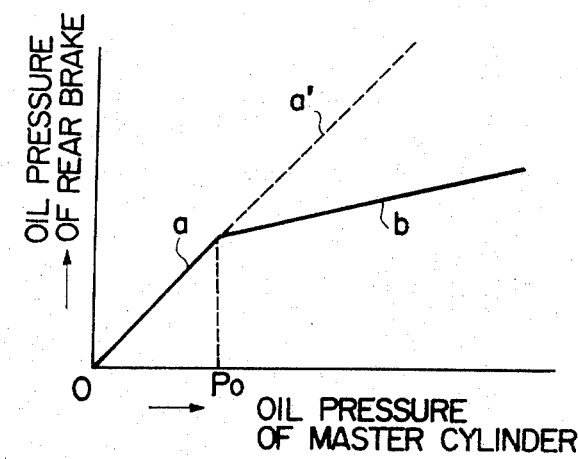
FIG. 2 is a graphical representation of the operational characteristics of a control valve assembly incorporated in one of the hydraulic circuits of the brake system as shown in FIG. 1.

In FIG. 2 the braking pressure exerted on one of the rear wheels is plotted against the master cylinder pressure in an arrangement where the control valve assembly 20 is a hydraulic pressure-proportioning valve which regulates the pressure in hydraulic circuit II connected to the rear wheel cylinders. In FIG. 2, it can be appreciated that, when the hydraulic pressure developed in master cylinder 10 is below a certain level Po, the control valve assembly is maintained in a non-operative condition. Accordingly, as the pressure in the master cylinder increased up to a certain point or level, the braking pressure in the rear wheel cylinders will increase linearly as displayed by the line a. When the pressure in the master cylinder exceeds the level Po, the control valve assembly becomes operative and the braking pressure supplied to the rear wheel cylinders increases at a reduced rate relative to the pressure in the master cylinder and this rate is indicated by the line b. Assuming that a failure occurs in the hydraulic circuit I, for example due to oil leakage in the circuit, the pressure supplied to the front wheel cylinders will drop considerably below that developed in the master cylinder. Under these conditions, even if the hydraulic circuit II is operating normally, the pressure in the rear wheel cylinders 13 and 14 is also reduced below the level in the master cylinder when the force exerted on the brake pedal 10a develops a pressure in the master cylinder above the pressure level Po as shown in FIG. 2. In such a situation, the braking effort exerted on the rear wheels is correspondingly reduced and the total braking effort applied to the front wheels and the rear wheels is below that required for normal operation of the two hydraulic circuits I and II.

When a failure takes place in hydraulic circuit II while hydraulic circuit I continues to operate normally, the front wheel cylinders receive the hydraulic braking fluid at a pressure corresponding to the force exerted on the brake pedal, as shown by the dotted line $a'$ which forms a rectilinear continuation of the line a in FIG. 2. In this situation the overall braking pressure in the system is higher than when a failure occurs in hydraulic circuit I. Accordingly, in view of the foregoing the present invention proposes a hydraulic brake system arrangement in which the control valve assembly is rendered non-operative when a failure occurs in the other circuit which is directly connected to the pressure in the master cylinder.

DETAILED DESCRIPTION OF THE INVENTION

In the various figures the same reference numerals are employed for similar parts of the split hydraulic brake system.

Figure 3:
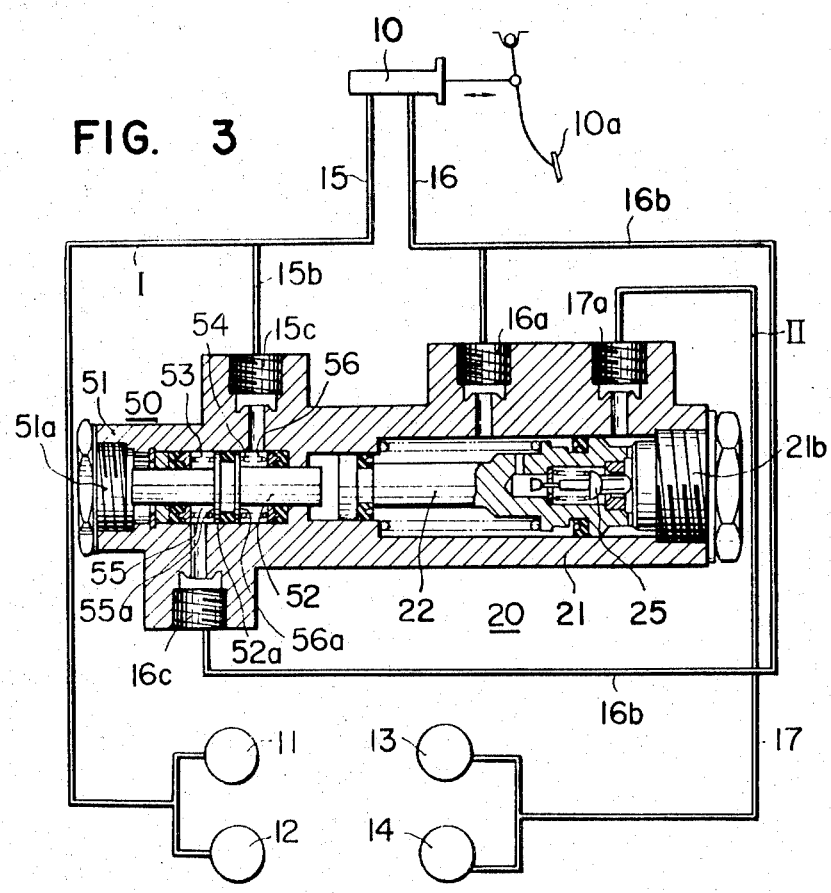
FIG. 3 is a partly schematic illustration of a dual hydraulic brake system, embodying the invention, with a detailed cross-sectional showing of the combined control valve assembly and balance piston operated member.

Referring first to FIG. 3, the general arrangement of a split or dual hydraulic brake system is illustrated, including a hydraulic brake pressure-proportioning valve 20 and a balance piston assembly 50.

In FIG. 3, a brake pedal 10a is operatively connected to master cylinder 10 for supplying pressurized hydraulic braking fluid into the lines 15 and 16. Line 15 is connected directly to front wheel cylinders 11 and 12, while line 16 is connected to rear wheel cylinders 13 and 14 through control valve assembly 20. control valve assembly 20 comprises a cylinder or casing 21 having an inlet port 16a and an outlet port 17a. Line 16 is connected to inlet port 16a. The interior of cylinder 21 receives a slidably displaceable valve piston 22. A spring 23 (FIG. 4) biases valve piston 22 to the right and toward a cylinder plug 21b which closes the right end of cylinder 21. Within the right end of valve piston 22, there is a chamber containing a spring biased poppet valve 25, poppet valve 25 being biased toward the right, as shown in FIG. 3. A valve seat at the right hand end of valve piston 2 cooperates with poppet valve 25.

When brake pedal 10a is depressed, hydraulic braking fluid under pressure is supplied from master cylinder 10 into both lines 15 and 16 and, from line 16, the braking fluid is supplied through inlet port 16a into cylinder 21 of control valve assembly 20, and then flows into the chamber in the right hand end of valve piston 22 through a radial port. In the position shown in FIG. 3, a projection on the outer end of poppet valve 25 abuts cylinder plug 21b, and poppet valve 25 is maintained in spaced relation from its valve seat. Consequently, the pressurized braking fluid flowing into the chamber in the right hand end of valve piston 22 flows unimpeded through an annular space around the projection of poppet valve 25 and then through radial passages in the right hand end of valve piston 22 to outlet port 17a, from which it flows into line 17 connected to rear wheel cylinders 13 and 14.

The hydraulic braking pressure exerted on the right hand end of valve piston 22 serves to move valve piston 22 to the left, as viewed in FIG. 3. As long as this hydraulic braking pressure is less than the spring pressure biasing valve piston 22 to the right, poppet valve 25 is maintained in its open position. As a result, hydraulic brake fluid is supplied to rear wheel cylinders 13 and 14 through control valve assembly 20 in line 17 without any change in pressure until the pressure in master cylinder 10 reaches the level Po, in accordance with the graphic illustration of FIG. 2.

When the pressure developed within master cylinder 10 reaches the level Po, the force exerted on piston 22 to move the same to the left causes the piston to move to the left until poppet valve 25 engages its valve seat. As the braking fluid pressure within master cylinder 10 exceeds the value Po, poppet valve 25 is closely seated against its valve seat, and a resultant pressure reduction occurs at outlet ports 17a as compared to the pressure at inlet ports 16a. Consequently, the axial force exerted to the left within cylinder 21 on valve piston 22 is reduced below the biasing force applied to the piston by its associated spring and by the hydraulic braking pressure acting on the annular area at the left of valve piston 22. Thus, poppet valve 25 is subjected to forces which tend to force it in the open position. However, a dynamic equilibrium exists between valve piston 22 and poppet valve 25 where, by an increase in the pressure at inlet port 16a, the pressure at outlet port 17a is reduced at a fixed rate with respect to the pressure at inlet 16a. By this arrangement, the braking pressure applied to rear wheel cylinders 13 and 14 varies along the straight line b in FIG. 2, and which has a smaller angle of slope than the straight line a.

The balance piston assembly 50 of FIG. 3 comprises a cylinder 51 extending axially from cylinder 21 of control valve assembly 20, and a piston 52 slidably displaceable within chambers 55 and 56 formed within cylinder 51. Respective balance springs 53 and 54 are arranged in chambers 55 and 56. Master cylinder 10 is connected to cylinder 51 through lines 15 and 15b at inlet port 15c, and also through lines 16 and 16b in inlet port 16c. Piston 52 is in axial alignment with piston 22, and the end of cylinder 51 remote from control valve assembly 20 is closed by a plug 51a. Hydraulic braking fluid within hydraulic circuits I and II, presurized within master cylinder 10, is supplied into chambers 56 and 55 through the respective inlet ports 16c and 15c. Assuming that both circuits I and II are in normal operating condition, the pressure within chambers 55 and 56 is the same as the pressure in master cylinder 10. Thus, the pressure is exerted on partitions 55a and 56a on piston 52 are in opposition to each other due to the pressure of the hydraulic braking fluid within chambers 55 and 56, so that a counterbalancing action occurs and maintains piston 52 in the position shown in FIG. 3 wherein the right hand end of the piston rod does not contact the left end of valve piston 22.

If, due to a failure in the pressure in hydraulic circuit I, there is a reduction in the pressure supplied through lines 15 and 15b and inlet port 15c into chamber 56, this results in unbalancing of the pressures in chambers 55 and 56. The pressure in chamber 55, which is the pressure in hydraulic circuit II, and which acts on partition 55a, tends to displace piston 52 to the right as viewed in FIG. 3. By providing springs 53 and 54 with lower spring constants, piston 52 can be made more sensitive to a pressure differential between chambers 55 and 56. When the pressure differential exists, piston 52 moves to the right and its piston rod contacts the left end of piston 22 to maintain control assembly 20 in the non-operative position.

Figure 4:
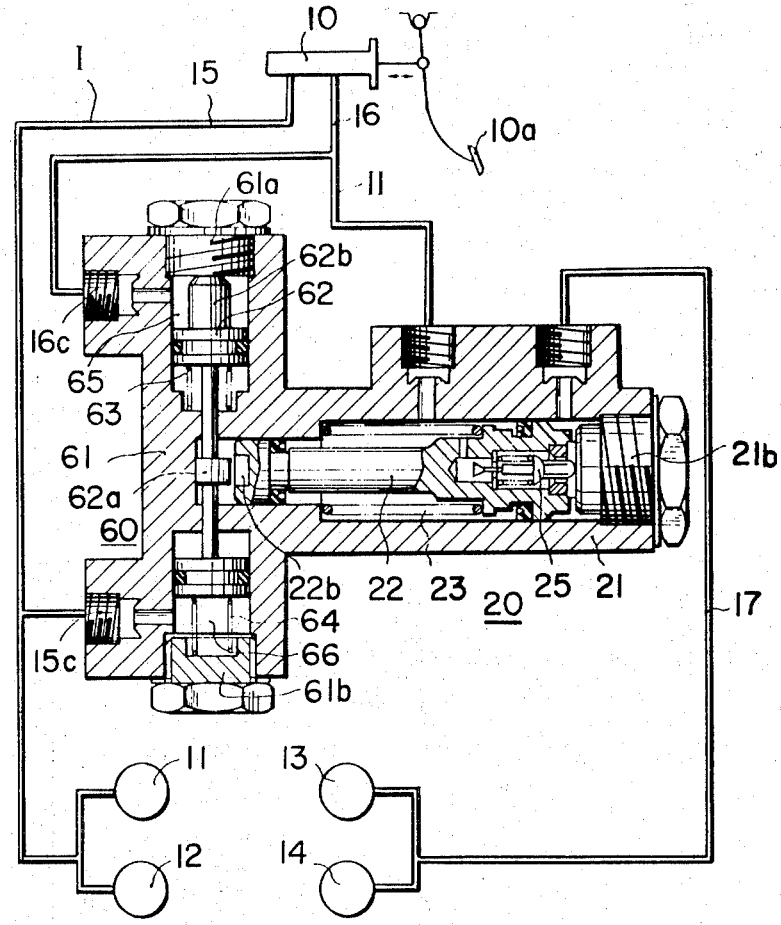
FIGS. 4 and 5 are views similar to FIG. 3, showing modified arrangements of the control valve assembly with a valve responsive to failure of the hydraulic pressure in the hydraulic circuit which does not include the control valve assembly.

FIG. 4 illustrates an embodiment of the present invention utilizing a balance piston controlled check means 60 to maintain control valve assembly 20 in the inoperative condition responsive to a decrease in the hydraulic braking pressure in the hydraulic circuit I connected to the front wheel cylinders 11 and 12. Balance piston check means 60 comprises a cylinder 61 extending transversely of and integral with cylinder 21 of control valve assembly 20. A piston 62 within cylinder 61 extends substantially normal to piston 22 in control valve assembly 20, and is under the influence of spaced biasing springs 63 and 64. The opposite ends of piston 62 are located within chambers 65 and 66 in cylinder 61, and the opposite ends of cylinder 61 are closed by respective upper and lower plugs 61a and 61b, as viewed in FIG. 4. Line 15 connects master cylinder 10 to an inlet port 15c communicating with chamber 66 of balance piston check means 60, and line 16 connects master cylinder 10 with an inlet port 16c communicating with chamber 65 of cylinder 61.

The pressurized braking fluid supplied through hydraulic circuits I (line 15) and II (line 16) is supplied through ports 15c and 16c into the respective chambers 65 and 66. Due to the bias of springs 63 and 64, an operating member 62b on the piston rod of piston 62 is urged into contact with plug 61a. An engaging piece 62a is mounted midway of piston 62, and is located at the left end of the chamber within cylinder 21 of control valve assembly 20, and opposite a recess 22b in the left end face of valve piston 22.

In the position illustrated in FIG. 4, if piston 22 is displaced to the left, recess 22b receives engaging piece 62a and permits axial displacement of valve piston 22. However, if the hydraulic brake fluid pressure in circuit I drops below the pressure in circuit II, a pressure differential will develop between chambers 65 and 66, so that piston 62 will be urged downwardly, displacing engaging piece 62a out of alignment with recess 22b in the end of valve piston 22. This prevents any leftward movement of valve piston 22, as engaging piece 62a is no longer aligned with recess 22b. Thus, when engaging piece 62a is displaced from its normal centered position, control valve assembly 20 is maintained in its non-operative condition.

Figure 5:
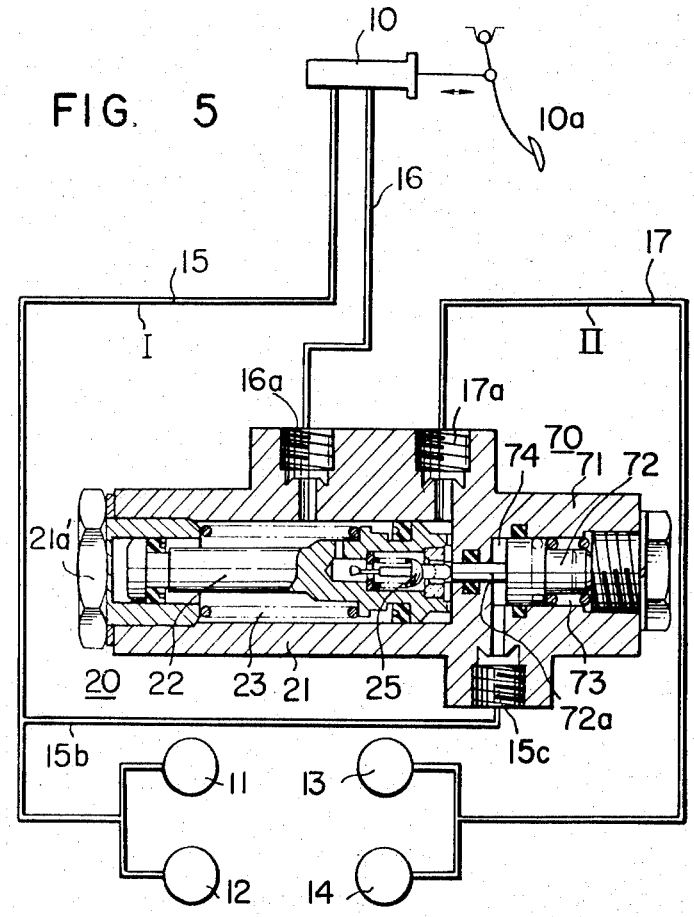

FIG. 5 illustrates an embodiment of the present invention in which a check means 60 is disposed in axial alignment with piston 22 of control valve assembly 20. In this embodiment, hydraulic braking fluid pressure is supplied to balance piston controlled check means 70 through a branch line 15b connecting line 15, which latter connects master cylinder 10 to front wheel cylinders 11 and 12, to inlet port 15c. Check means 70 comprises a cylinder 71 attached to or integral with cylinder 21 of control valve assembly 20, and a piston 72 positioned within cylinder 71 and biased to the left in a cylinder chamber 24, by a spring 73.

Normally, piston 72 is retained at the position shown in FIG. 5 by the pressure exerted by the braking fluid in hydraulic circuit I. The pressure within circuit I is normally the same as that in master cylinder 10 but, when the pressure in circuit I is decreased because of a failure, piston 72 is urged to the left under the bias of spring 73. A projection 72a on the left end of piston 72 extends from the left through an apertured partition into cylinder 21 of control valve assembly 20, and abuts against poppet valve 25. This causes valve 25 to move to the left, where it is maintained in the open position by projection 72a and irrespective of any occasional operative positions assumed by valve piston 22. With poppet valve 25 in its open state, control valve assembly 20 is in its non-operative condition.

FIG. 6 illustrates a dual or split hydraulic brake system in which front wheel brake cylinders 11 and 12 are directly and independently supplied with brake fluid under pressure from hydraulic circuits I and II, while rear wheel brake cylinders 13 and 14 are supplied through respective control valve assemblies 20a, 20a.

In a somewhat similar embodiment illustrated in FIG. 7, hydraulic circuits I and II are connected to he front and rear wheel brake cylinders in a criss-cross or staggered relation. The brake fluid under pressure from master cylinder 10 is supplied, as before, to wheel cylinders 12, 13 and 11, 14 through the respective hydraulic circuits I and II, with the front wheel cylinders being directly supplied and the rear wheel cylinders being supplied through respective control valve assemblies 20a, 20a.

In a further similar arrangement, shown in FIG. 8, the hydraulic circuits I and II are arranged symmetrically and in parallel with each other with respect to the brake cylinders. In this system, even with the failure of either one of the circuits, the hydraulic pressure is maintained in a positive manner in the brake cylinders by means of the remaining normally operating circuit.

The arrangement of the check means as above described, and in which the valve piston 22 is held in its initial position and the control valve assembly 20 is rendered non-operative, can be applied to any other hydraulic pressure control device. It will be appreciated from the foregoing disclosure that there is substantially no fear of a considerable reduction in the braking effort when a failure occurs in one of the two hydraulic circuits, since the pressurized brake fluid from master cylinder 10 can be supplied to the brake cylinders in the circuit operating at the master cylinder pressure. Accordingly, with the arrangement of the present invention, braking distances can be decreased substantially with an increase in traffic safety.

While specific embodiments of the invention have been shown and described in detail to illustrate the application of the principles of the invention, it will be understood that the invention may be embodied otherwise without departing from such principles.

What is claimed is:

1. In a dual hydraulic brake system for automotive vehicles having front and rear wheels and including two separate hydraulic circuits connected to a master cylinder and each including the hydraulic brakes of a respective set of wheels, and pressure regulating control valve means in one circuit, having an inlet connection to the master cylinder and an outlet connected to the respective hydraulic brakes, and regulating the hydraulic brake pressure at its outlet in accordance with the hydraulic pressure in the master cylinder, the improvement comprising, in combination, a balance piston actuated component operatively associated with said control valve and operable, when actuated, to render said control valve ineffective to regulate the pressure at its outlet, to maintain its outlet pressure substantially equal to the master cylinder pressure; balance piston means connected to said component to actuate said component; and means supplying the hydraulic pressure in the other circuit to said balance piston means in opposition to a balancing force exerted thereon, the opposing pressures exerted on said balance piston means, when the pressures in both hydraulic circuits between said master cylinder and said control valve means are substantially equal, maintaining said balance piston means in a neutral position in which said component is not actuated; said balance piston means, responsive to a decrease in pressure in said other hydraulic circuit relative to the pressure in said one hydraulic circuit actuating said component to render said control valve means ineffective.

2. In a dual hydraulic brake system, the improvement claimed in claim 1, in which said pressure regulating control valve comprises a body formed with a cylindrical bore communicating with said inlet and said outlet, and a valve piston displaceable in said bore and controlling communication between said inlet and said outlet; said component, when actuated, being movable into said bore to engage said valve piston and displace said valve piston to a position providing substantially unrestricted communication between said inlet and said outlet.

3. In a dual hydraulic brake system, the improvement claimed in claim 2, in which said valve piston is formed with a passage therethrough communicating with said inlet and outlet ports; and a poppet valve mounted in said valve piston and controlling flow of fluid through said passage; said component, when actuated, displacing said poppet valve to a position opening said passage.

4. In a dual hydraulic brake system, the improvement claimed in claim 3, wherein said poppet valve has an operating head projecting from an end of said valve piston and engageable with an end closure of said bore upon displacement of said valve piston to open said poppet valve; said component comprising a plunger connected to said balance piston means and engageable with the opposite end of said valve piston to displace said valve piston in a direction to engage said poppet valve with said end closure of said bore to open said poppet valve.

5. In a dual hydraulic brake system, the improvement claimed in claim 4, in which said plunger, when actuated, is displaceable in a direction substantially normal to and intersecting the path of movement of said valve piston.

6. In a dual hydraulic brake system, the improvement claimed in claim 3, in which said poppet valve has an operating head projecting from one end of said valve piston; said component comprising a plunger actuated by said balance piston means and axially aligned with said poppet valve and having an inner end normally flush with an end wall of said bore; said poppet valve being engageable with an inner end of said plunger during displacement of said valve piston; said plunger, when actuated, projecting its inner end inwardly of said end wall of said bore to displace said poppet valve to a position opening said passage.

7. In a dual hydraulic brake system, the improvement claimed in claim 1, including means connecting said one circuit, between said master cylinder and said control valve means, to said balance piston means to supply said balancing force.

8. In a dual hydraulic brake system, the improvement claimed in claim 3, in which said balance piston means comprises a cylinder in axial alignment with said cylindrical bore; a piston within said cylinder and having a pair of axially spaced annular projections thereon dividing said cylinder into a first chamber containing one of said annular projections and a second chamber containing the other of said annular projections; said first chamber being connected to said other hydraulic circuit; and means connecting said second chamber to said one hydraulic circuit between said master cylinder and said control valve assembly; said component extending axially from said piston into said cylindrical bore in axial alignment with said valve piston; whereby hydraulic fluid is supplied from said master cylinder into said first and second chambers and, when a pressure failure occurs in said other hydraulic circuit, a pressure differenrial develops between said first and second chambers and displaces said piston in a direction to project said component further into said cylindrical bore to hold said control valve assembly in the non-operative condition.

9. In a dual hydraulic brake system, the improvement claimed in claim 3, in which said balance piston means comprises a cylinder extending transversely of the axis of said cylindrical bore and divided into first and second chambers on respective opposite sides of said cylindrical bore; a balance piston member including respective pistons in each of said chambers and interconnected by a piston rod extending between said chambers and intersecting said cylindrical bore adjacent one end of the latter; an engaging piece on said piston rod in said cylindrical bore; said engaging piece and said piston rod being axially displaceable between a center position and an off-center position; said valve piston having a recess in its end adjacent said engaging piece, and said recess receiving said engaging piece when said engaging piece is in its center position; said first chamber being connected to said other hydraulic circuit' and means connecting said second chamber to said one hydraulic circuit; where, when a differential pressure between said chambers occurs in said balanced piston means, said engaging piece is displaced into its off-center position to prevent axial displacement of said valve piston to maintain said control valve assembly in its non-operative condition; said engaging piece constituting said balance piston actuated component.

10. In a dual hydraulic brake system, the improvement claimed in claim 3, in which said balance piston means comprises a cylinder in axial alignment with said cylindrical bore and separated therefrom by an end wall having an aperture therein axially aligned with said poppet valve; a piston within said cylinder and dividing said cylinder iknto first and second chambers; said first chamber being connected to said other hydraulic circuit for application of the hydraulic brake pressure therein to one face of said piston; a spring in said second chamber biasing said piston toward said cylindrical bore, said spring providing said balancing force counterbalancing the hydraulic pressure in said other hydraulic circuit; and a plunger on said piston extending through said aperture in alignment with said poppet valve and constituting said component; the end of said plunger being flush with said end wall surface when said piston is in the balanced condition; said piston, responsive to a decrease in pressure in said other hydraulic circuit being biased by said spring to move in a direction projecting said plunger into said cylindrical bore to hold said poppet valve open to maintain said control valve assembly in the non-operative condition.

11. In a dual hydraulic brake system, the improvement claimed in claim 1, in which one of said hydraulic circuits includes the wheel cylinders of both front wheels and the other of said hydraulic circuits includes the wheel cylinders of both rear wheels.

12. In a dual hydraulic brake system, the improvement claimed in claim 1, in which each hydraulic circuit includes the wheel cylinders of both front wheels and the wheel cylinder of a respective rear wheel; each hydraulic circuit including a respective control valve means connected between said master cylinder and the wheel cylinder of the associated rear wheel.

13. In a dual hydraulic brake system, the improvement claimed in claim 1, in which one of said hydraulic circuits includes the wheel cylinder of the right front wheel and the wheel cylinder of the left rear wheel, and the other of said hydraulic circuits includes the wheel cylinder of the left front wheel and the wheel cylinder of the right rear wheel; each hydraulic circuit including a respective control valve means connected between said master cylinder and the wheel cylinder of the associated rear wheel.

14. In a dual hydraulic brake system, the improvement claimed in claim 1, in which each hydraulic circuit includes the wheel cylinders of both front wheels and the wheel cylinders of both rear wheels; each hydraulic circuit including a respective control valve means connected between said master cylinder and the wheel cylinders of the rear wheels.

* * * * *